United States Patent [19]
Ballenger

[11] 3,880,378
[45]*Apr. 29, 1975

[54] CORD STORAGE REEL ASSEMBLY

[75] Inventor: William G. Ballenger, Highland Park, Ill.

[73] Assignee: Central Specialties Co., Chicago, Ill.

[ * ] Notice: The portion of the term of this patent subsequent to Oct. 17, 1989, has been disclaimed.

[22] Filed: Sept. 20, 1972

[21] Appl. No.: 290,772

Related U.S. Application Data

[63] Continuation-in-part of Ser. No. 192,374, Oct. 26, 1971, Pat. No. 3,698,656.

[52] U.S. Cl............... 242/96; 242/54 R; 242/129.5
[51] Int. Cl............................................. B65h 75/40
[58] Field of Search........... 242/96, 106, 54 R, 129, 242/129.5-129.82, 100, 107 R; 191/12.2 R

[56] References Cited
UNITED STATES PATENTS

| | | | |
|---|---|---|---|
| 2,601,960 | 7/1952 | Hick | 242/129.6 |
| 2,605,977 | 8/1952 | Gleason | 242/54 R |
| 2,893,657 | 7/1959 | Van de Bilt | 242/128 |
| 3,698,656 | 10/1972 | Ballenger | 242/106 |

Primary Examiner—Leonard D. Christian
Attorney, Agent, or Firm—Dominik, Knechtel, Godula & Demeur

[57] ABSTRACT

There is disclosed a storage reel assembly for use in connection with mounting and storing cords, such as electrical cords or the like, which includes a pair of wheels formed of an outer ring and an inner ring, the outer and inner rings being spaced apart by a plurality of spokes, the two wheels being spaced apart and held in horizontal alignment by means of a series of rods having the inner ends mounted on the spokes of the inner wheel and the outer ends of the rods being mounted on the spokes of the outer wheel, the outer ends of the rods extending outwardly from the spokes of the outer wheel for a distance and cooperating to form an auxiliary reel external of the storage reel, a support plate for mounting the storage reel to a support surface, a shaft provided for mounting the reel in rotatable relation to the support surface, and mounting means for mounting the support plate to an underlying support surface.

13 Claims, 15 Drawing Figures

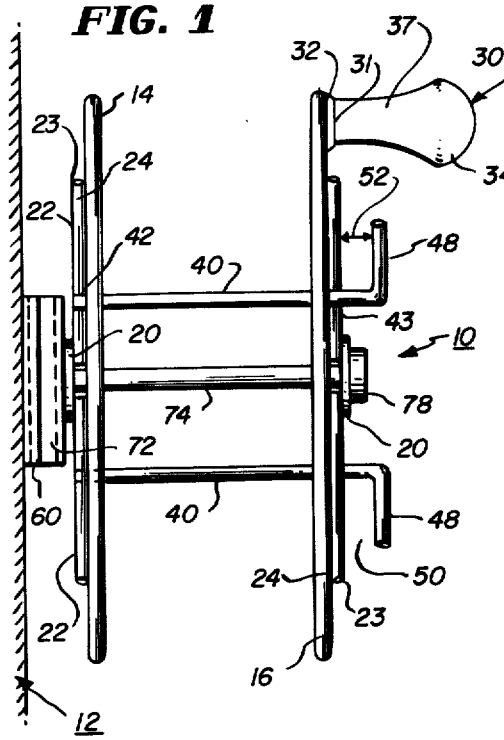
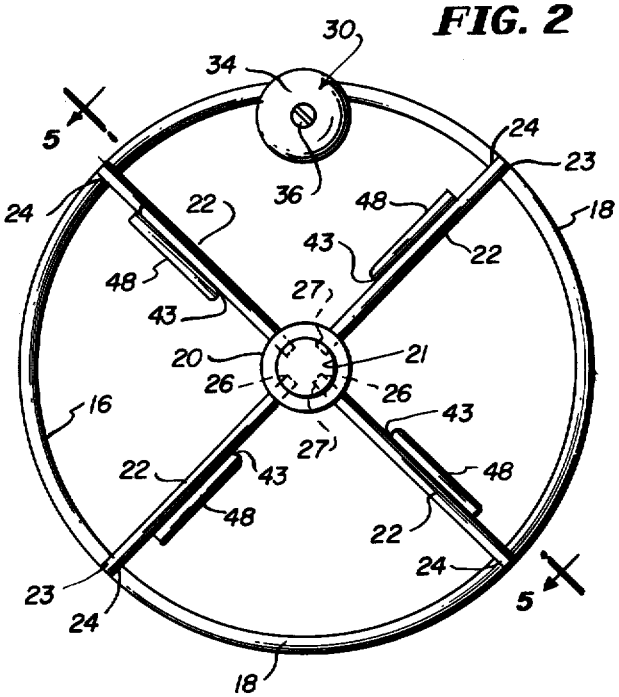
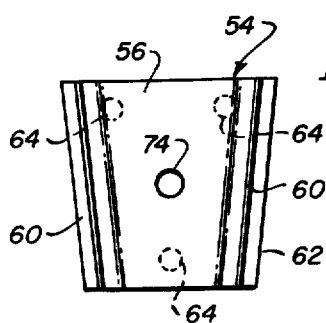
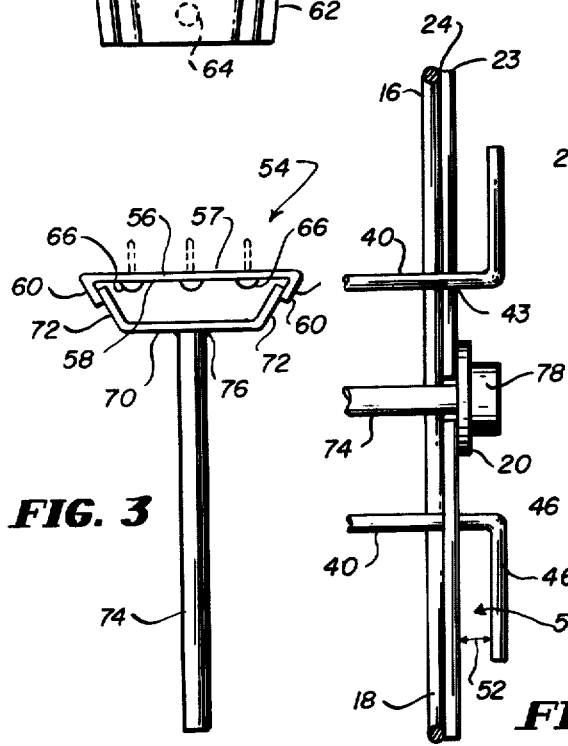

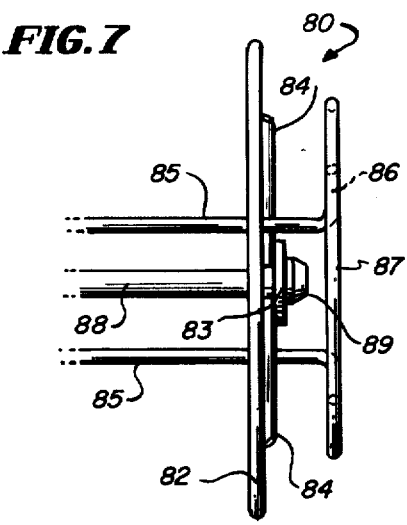
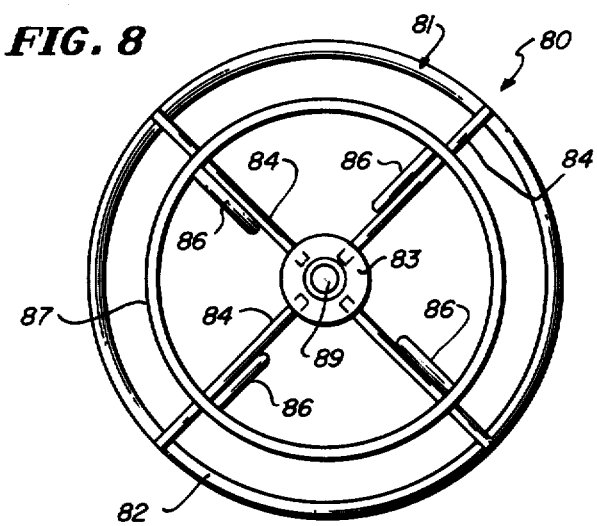
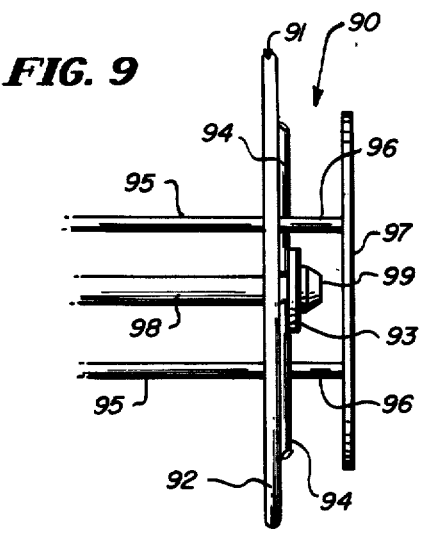
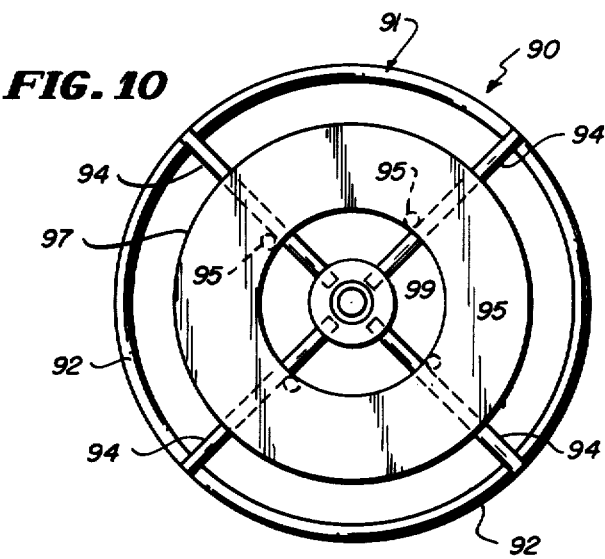
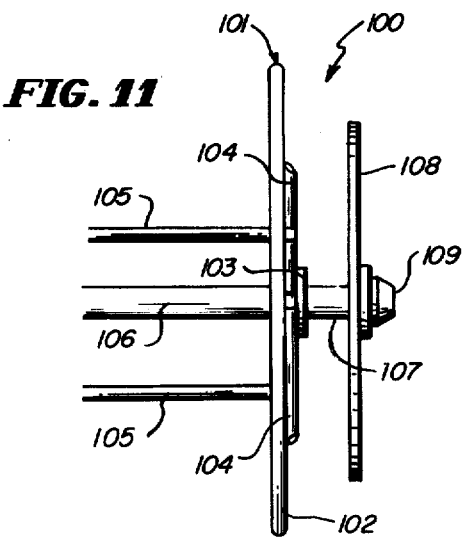
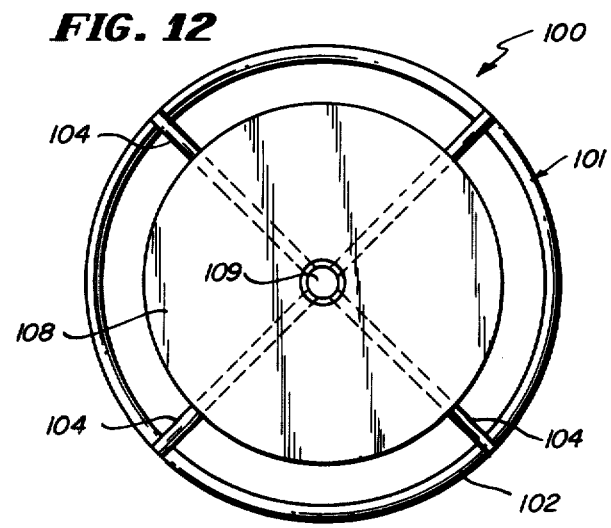

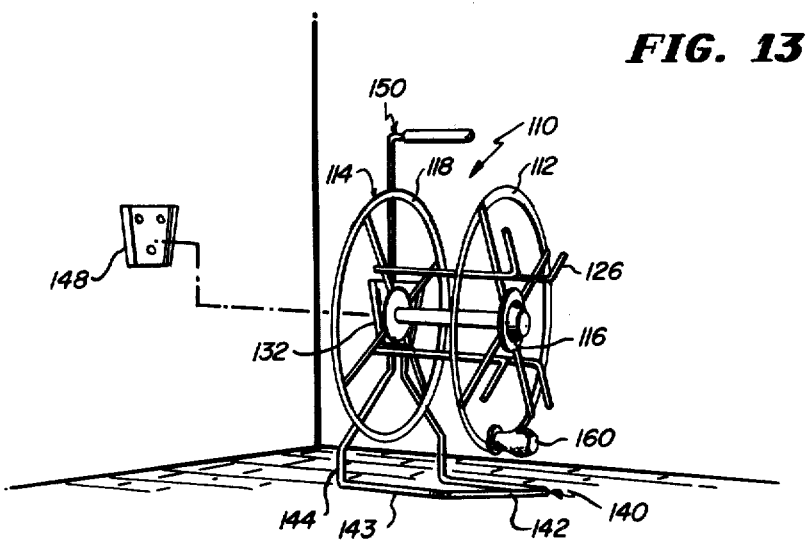
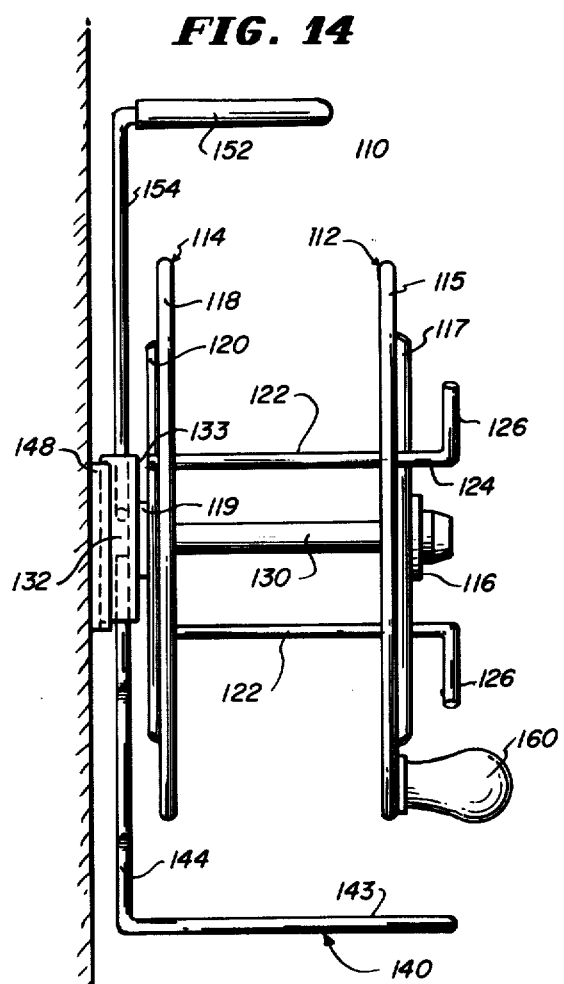

CORD STORAGE REEL ASSEMBLY

CROSS REFERENCE TO RELATED APPLICATION

This application is a continuation-in-part of copending application, Ser. No. 192,374 filed on Oct. 26, 1971 in the name of William G. Ballenger and now U.S. Pat. No. 3,698,656 and entitled CORD STORAGE REEL ASSEMBLY.

BRIEF DESCRIPTION OF THE INVENTION

This invention is directed to a novel storage reel assembly for storing cords such as electrical extension cords, electrical appliance cords, and the like, which is so constructed so as to provide a main storage core reel, and an auxiliary storage reel external to the main storage core reel, the auxiliary reel permitting the operator to secure a length of the electrical cord adjacent to the male plug by winding a length around the auxiliary reel thereby permitting access to the male plug for connecting the same to an electrical outlet without at the same time necessitating the unwinding of the complete reel in order to gain access to the male member. The storage reel of the present invention permits of simple construction while at the same time permitting compact storage of fairly long electrical cords, and further permits efficient use of the cord while at the same time avoiding the problem of the cord tangling during use.

BACKGROUND OF THE INVENTION

It will be noted that heretofore in the art, the only practical method for storing electrical cords, such as extension cords, or the like, has been to manually wrap such cords into a loop and in the usual storage method, a band of wire, or rubber band or some other such device is placed about the center of the wrapped band or cord, thereby forming a figure 8. The wrapped cord is thereafter usually hung on a hook or peg until subsequently utilized by the operator. When a subsequent use is intended, due to the fact that such cords are usually composed of electrical wire having rubberized insulation wrapped thereabout, the continued wrapping and unwrapping of such cords in the manner set forth above usually results in such cords developing twists and bends which can damage the electrical wires within the cord, as well as resulting in a difficult and time consuming job in unwrapping the cord and removing the various bends, kinds and twists, which become inherent in the cord after repeated uses.

The problem is even more enhanced where extension cords of the length of 100 feet or more are utilized since such cords usually do not permit for compact storage. Once kinks and bends develop in the cord, these kinks and bends cannot be easily removed without unravelling the complete cord, laying the same on a flat surface and thereafter rewrapping or banding the cord for storage purposes. It will be appreciated that where a 100 foot length of extension cord of the outdoor variety is utilized, due to the fact that such cords are relatively thick, the difficulties presented to the operator in unravelling the complete length of such cords, removing the kinks and bends, and subsequently rewrapping the cord is burdensome. Furthermore, when such cords are utilized in connection with an appliance, such as for example, where a 100 foot length of an outdoor extension cord is utilized in connection with an electric lawnmower, in the usual application, the complete 100 foot cord must be unwrapped and left to lie on the ground. The danger of such use becomes clearly apparent: the cord may be easily run over by the operator when utilizing the lawnmower; or as the operator moves back and forth with the lawnmower, the cord becomes tangled and twisted whereby following use by the operator, the operator would have a difficult time rewrapping the cord for storage purposes; or there is the inherent danger that other persons may trip and fall upon such cords while they are lying loosely upon the ground.

Various other problems of cord storage have been observed in industrial as well as commercial applications. For example, it has been noted in many small industrial plants, often times various appliances such as drills, sanders and the like, have extremely long cords for use throughout a shop area, While some of such appliances have automatic rewind reels associated therewith, often times many of these appliances do not have such automatic rewinds, and in such cases, the only alternative is for the operator to have the complete length of cord of the appliance lying loosely upon a surface such as a workbench or floor, which again presents all of the attended dangers of accidental tripping of other persons, the danger of the cord being cut by the appliance, or some other appliance, and other similar dangers. Another associated problem in connection with such applications is the fact that heretofore, no convenient means for storing these appliance cords has been developed and hence, the usual means of storage is to manually wrap the cord into a loop configuration after which the cord is banded about the middle forming a figure 8 configuration for storage purposes. It is clear that as mentioned above, the manual wrapping of cords in this manner produces kinks and bends in the cord, which will ultimately wear and break the electrical wiring within the cord, as well as present difficult and burdensome problems to the operator as he prepares for each subsequent use of the appliance in connection with the unwinding or unwrapping of the cord prior to use.

It is therefore the principal object of the present invention to provide an efficient means for storing cords, such as electrical cords and the like, which permits compact storage of the cord when not in use, while at the same time permitting a very convenient and efficient method of utilizing the cord when desired.

Another object of the present invention is to provide a storage reel for cords and the like which consists of a pair of wheels, each of the wheels formed by an outer ring and an inner ring, and having a plurality of spokes mounted on and interconnecting the outer ring and inner ring thereof, each of the wheels of the pair of wheels being spaced apart and held in horizontal alignment by means of a plurality of rods, each of the rods being mounted on and interconnecting associated spokes of the horizontally aligned wheels, the space between the pair of wheels forming a storage core for the cord, each of the rods extending downwardly for a distance beyond the existing spokes of one of the wheels and thereby cooperating to form an auxiliary reel external to the storage reel for the purpose of accommodating a length of the cord stored thereon, especially the length of cord adjacent the male member of the cord, support means for rotatably supporting the storage reel on a support surface, and a handle provided upon the wheel for permitting rotary movement of the storage reel to reel in and reel out the cord when use and/or storage is desired.

In connection with the foregoing object, it is still another object of the present invention to provide a storage reel of the type described which includes means for removably mounting the reel on a support plate which is mounted to a support surface, such as a wall or the like, whereby the complete storage reel may be detached from one support plate mounted in one location and moved to another support plate mounted in another location thereby to permit easy transport of the storage reel from one place to another.

Still a further object of the present invention is to provide a storage reel assembly for use in connection with the storing of cords such as electrical cords, or the like, which is simple in construction, while nevertheless permitting compact storage of lengths of cord of up to 200 feet, depending upon the thickness of such cords, while at the same time affording the operator ease in connection with the subsequent use of such cords to operate an appliance.

Another object of the present invention is to provide a storage reel for cords and the like which includes structure forming an auxiliary reel external to the main storage reel, which thereby permits the operator to secure a length of the cord adjacent the male member by winding the same about the auxiliary reel thereby permitting access of the male plug to an electrical outlet which may be located within a few feet of the location in which the storage reel is mounted avoiding the necessity of completely unreeling the complete length of cord in order to gain access to the male plug to achieve electrical connection.

In connection with the foregoing object, it is still another object of this invention to provide a storage reel of the type described above, wherein the provision of an auxiliary reel permits the securement of the dangling end of the cord during the rewind of the cord onto the main storage reel, thereby avoiding the problem of having the fixed end of the cord hanging loosely during the rotation of the main storage reel to accomplish rewinding and avoiding danger to the operator during such rewinding operation.

Further features of the invention pertain to the particular arrangement of the parts whereby the above-outlined and additional operating features thereof are obtained.

The invention, both as to its organization and method of operation, together with further objects and advantages thereof will best be understood by reference to the following specification taken in connection with the accompanying drawings, in which:

FIG. 1 is a side elevational view of the storage reel of the present invention, mounted upon a suitable support surface.

FIG. 2 is a front elevational view showing the outer ring of the storage reel and the associated handle provided for turning the reel;

FIG. 3 is a top view showing the mounting brackets for mounting the reel to a support structure and the shaft associated with the support plate for the storage reel assembly;

FIG. 4 is a front elevational view showing the mounting plate which is affixed to a suitable support structure for receiviing and supporting the support plate of the storage reel;

FIG. 5 is a cross sectional view showing the construction of one of the rings of one of the wheels and the cross rods which are turned upwardly to form the auxiliary reel taken in the direction of the arrows along the line 5—5 of FIG. 2;

FIG. 6 is a plan view showing the storage reel of the present invention having an electrical cord stored thereon with the male portion of the cord and a length of such cord wound about and secured within the auxiliary reel.

FIG. 7 is a side elevational view of another embodiment of the storage cord reel of the present invention wherein the auxiliary reel is formed by a plurality of rods extending outwardly from the spokes of the associated wheel and terminating in hook members which then provide with a circular ring bounding the extent of the auxiliary reel;

FIG. 8 is a front elevational view of the storage cord reel as shown in FIG. 7 of the drawings;

FIG. 9 is a side elevational view showing still another embodiment of a storage cord reel of the present invention wherein the auxiliary reel is formed by an enlarged flat washer mounted on the rods which extend outwardly from the associated wheel;

FIG. 10 is a front elevational view of the cord storage reel of the present invention as shown in FIG. 9 of the drawings;

FIG. 11 is a side elevational view of still another embodiment of a cord storage reel of the present invention wherein the auxiliary reel is formed by a flat plate, mounted on the central shaft which extends outwardly from the outer ring a sufficient distance to permit the formation of an auxiliary reel between the flat plate and the outer ring;

FIG. 12 is a front elevational view of the cord storage reel as shown in FIG. 11 of the drawings;

FIG. 13 is a plan view of another embodiment of a cord storage reel of the present invention wherein the cord reel is mounted to a plate which is, in turn, fixedly mounted on a stand structure, the complete assembly being mountable and demountable from a support plate carried on a wall or other structure;

FIG. 14 is a side elevational view of the cord storage reel as shown in FIG. 13 of the drawings, the storage reel being shown in the mounted position upon the support plate carried by an underlying support surface; and FIG. 15 is a front elevational view of the cord storage reel as shown in FIGS. 13 and 14 of the drawings, indicating the manner of the fixed securement of the stand to the cord storage reel support plate.

Referring now to the drawings, and with special reference to FIG. 1, 2 and 6, there is shown a storage reel, generally referred to by the numeral 10, which in FIG. 1, is shown to be mounted on a wall 12, in a manner to be described more fully hereinafter.

The storage reel 10 consists of a pair of wheels 14 and 16, which for the sake of convenience will be referred to as the rear wheel 14 and the front wheel 16, the designation rear and front having reference to the storage reel 10 as mounted upon the wall 12. Each wheel is formed by means of an outer ring 18, an inner ring 20, and a series of four spokes 22, each of the spokes having the outer end 23 mounted on the outer ring 18 by means of a weldment 24, and the inner ends 26 of each of the spokes 22, mounted on the inner ring 20, similarly by means of a weldment 27. Hence, it is apparent that each of the wheels 14 and 16 form a solid construction by means of the outer ring 18 inner ring 20 and spokes 22.

The front wheel 16 is also provided with a handle assembly generally referred to by the numeral 30 which includes a washer 31 suitably mounted on the outer ring 18 by means of a weldment 32. The handle 34, is centrally cored (not shown) thereby to accommodate a bolt 36 which is received through the central core and held in position by means of a nut (not shown) thereby to secure the handle 34 to the washer 31. When assembled, the nut holding bolt 36 is only loosely tightened such that the handle 34 is permitted rotary movement as the operator rotates the storage reel 10. It will further be noted that the handle 34 has a curvilinear form as indicated at 37 thereby to provide a comfortable grasping point for the operator.

The rear wheel 14 and front wheel 16 are held in spaced apart and horizontal alignment by means of a series of four spacer rods 40. The inner end of each of the spacer rods 40 is mounted on an associated spoke 22, of the rear wheel 14, by means of a weldment 42 at a point approximately intermediate the length of the spoke 22. Similarly, the outer end of each of the spacer rods 40 is mounted on an associted spoke 22 of the front wheel 16 also by means of a weldment 43, thereby resulting in a very solid construction for the storage reel 10 including a rear wheel 14 and front wheel 16 held in solid and fixed relationship one with respect to the other.

Each of the spacer rods 40 includes an extension portion 46 which extends outwardly beyond the associated spoke 22 of the front wheel 16 for a short distance, each of the extension portions 46 terminating in a hook member 48, the hook member 48 being in planar relation with respect to the extension portion 46. It will be noted that each of the hook members 48 are turned upwardly in the direction of the outer ring 18 of the front wheel 16, and as shown in FIGS. 1 and 6 of the drawings, the hook members 48 cooperate together thereby to form an auxiliary reel, generally designated by the numeral 50, external to the main storage reel 10, the auxiliary storage reel 50 being formed by the space 52 existing between each of the hook members 48 and the associated spoke 22. The purpose and function of the auxiliary reel 50 will be described more fully hereinafter.

In FIGS. 1, 3, 4 and 5 of the drawings, the method of mounting the storage reel 10 of the present invention to a suitable support surface, such as a wall 12, is illustrated. With respect to FIG. 4 there is shown a wall bracket 54 which is generally formed by means of a plate 56, having a rear surface 57 which contacts the wall 12 and a front surface 58. The side edges of the plate 56 are shown to be turned inwardly in a direction away from the rear surface 57 thereby forming a pair of side rails 60. Additionally, the plate 56 is shown to be tapered inwardly from top to bottom thereof, as generally illustrated at 62, (FIG. 4). The bracket 54 is provided with a series of three apertures 64 to accommodate three screws 66, for mounting the bracket 54 to the wall 12.

In order to accomplish the mounting of the storage reel 10 to the wall 12, the assembly further includes a support plate 70 (FIG. 3) having the side edges 72 thereof being turned outwardly and rearwardly. The support plate 70 is similarly tapered from top to bottom in the same manner as the taper 62 of the bracket 54. The side edges 72 of the support plate 70 thereby cooperate with the side rails 60 of the bracket 54 to facilitate the slidable mounting of the support plate 70 within the side rails 60 of the bracket 54.

The support plate 70 further includes a shaft 74 which is suitably mounted to the support plate 70 by any appropriate means such as a weldment 76, the shaft 74 being disposed in planar relation with respect to the support plate 70. It will be noted by reference to FIG. 2, that the inner ring 20 which forms a part of the construction of each of the rear wheel 14 and front wheel 16, has a central aperture 21 which has a diameter slightly greater than the diameter of the shaft 74. Hence, in order to mount the storage reel 10 onto the shaft 74, once the support plate 70 has been mounted on the bracket 54, the operator need only slide the storage reel onto the shaft by inserting the shaft 74 through the aperture 21 in the inner ring 20 of the rear wheel 14 and through the aperture 21 in the inner ring 20 of the front wheel 16, as shown in FIG. 1. The shaft 74 is of sufficient length to extend through the entire storage reel assembly 10, and for a short distance outwardly beyond the inner ring 20 of the front wheel 16. In order to retain the storage reel 10 on the shaft 74, a press fitted cap 78 is provided which is pressure fitted over the end of the shaft 74 thereby to retain the storage reel 10 thereon.

In the preferred embodiment, especially where use for the subject of the present invention is intended for a storage reel for electrical extension cords or the like, each of the wheels 14 and 16 measure 9 inches in outside diameter. The spokes 22 of each of the wheels are positioned and welded exactly 90° apart, one from the other, and the four spacer rods 40 mounted on and interconnecting associated spokes 22 are each mounted approximately two inches away from the main shaft 74. Hence, the total distance between opposed spacer rods 40, is 4 inches, thereby resulting in a main storage core which would measure between 4 and 5 inches deep. This dimension is of importance since it has been found that if the core were to be much deeper than this, the cord would have a tendency to wind too tightly adjacent the central portion of the core and in time, the wires within the insulated jacket of the cord would be continually placed under extreme stress ultimately resulting in fraying and splitting of the wire.

Each of the spacer rods 40 includes an extension portion 46 as mentioned above, terminating in a hook member 48. Dimensionally, the extension portion 46 extends approximately one-half inch outwardly from the outer ring 18 and is bent at a 90° angle with respect to the associated spacer rod 40 and extends upwardly toward the outer ring 18 for a distance of approximately 2 inches. Hence, the auxiliary reel 50 is formed by the four hook members 48, the auxiliary reel 50 being one-half inch in width and 2 inches in height. With such dimensions, the auxiliary reel 50 will accommodate up to about 15 feet of the flat type extension cord, and up to about 10 or 12 feet of the round type extension cord.

The main storage core of the storage reel 10 measures about 4¼ inches in width and between 4 and 5 inches in depth. With such dimensions, the main storage reel will hold approximately 100 feet of number 16, or number 14 flat three wire cord, as well as approximately 100 feet of number 16 three wire type round extension cord. Where the operator desires to store number fourteen three wire type round extension cord, the main storage reel 10 will hold approximately 50 feet of such wire.

Both of the wheels 14 and 16 respectively as well as the spacer rods 40 and spokes 22 are formed of three-sixteenth inch barstock steel which are then zinc plated. It has been found that such material is ideal for outdoor use and will not easily be damaged or rust due to weather conditions. The shaft 74 is formed of a three-eighths inch rod and is approximately 5¼ inches long. The inner ring 20 is formed of a washer which has an outside diameter of 1½ inches and an inside diameter of 0.390 inch, the washer being formed of 16 gauge steel. From these dimensions it will be apparent that the shaft 74 will fit through the aperture 21 disposed in the inner ring 20 with ease whereby the complete storage reel assembly 10 is rotatably mounted on the shaft 74 and may be easily rotated by the operator via the handle assembly 30.

With reference to FIGS. 7 and 8 of the drawings, a slightly modified embodiment of the cord storage reel of the present invention is illustrated. There is shown a cord storage reel 80 which includes a front wheel 81 similarly formed by an outer ring 82 and an inner ring 83, the rings 82 and 83 being connected by a plurality of spokes 84. The front wheel 81 is connected to a rear wheel (not shown) by means of a plurality of connecting rods 85. Each of the connecting rods 85 is shown to extend outwardly beyond the front wheel 81 a short distance and then turned upwardly in the direction of the outer ring 82, whereby each connecting rod 85 includes an outturned portion 86. An auxiliary ring 87 is provided, the auxiliary ring 87 being mounted on the outer edges of each of the outturned portions 86 of the connecting rods 85.

With reference to FIG. 8 of the drawings, the construction of the auxiliary ring 86 with respect to the outturned portions 86 of the connecting rods 85 is illustrated.

As existed with the cord storage reels described hereinabove, the complete reel assembly 80 is held in position on a shaft 88 in rotatable relation by means of a press fitted cap 89. Hence, the auxiliary storage reel is provided with an auxiliary ring thereby to form a boundary for the auxiliary reel when in use.

In FIGS. 9 and 10 of the drawings, still another embodiment of the cord storage reel is illustrated. There is shown a cord storage reel assembly 90 which is similarly formed by the front wheel 91 constructed by an outer ring 92 and an inner ring 93 the outer ring 92 and inner 93 being connected by means of a plurality of four spokes 94. The front wheel 91 is connected to a rear wheel, (not shown) by means of a plurality of four connecting rods 95 in the manner described previously. Each of the connecting rods 95 is shown to extend outwardly for a distance beyond the front wheel 91 thereby to form an extension portion 96. A centrally apertured flat ring 97 is provided, the flat ring 97 being mounted to the extension portions 96 of each of the connecting rods 95 by means of weldments or other suitable secure fastening means. The flat ring 97 along with the extension portions 96 of the connecting rods 95 delineates the auxiliary storage reel and provides the storage space for the portion of the electrical cord stored thereon, especially that portion adjacent the male end of the cord. The storage reel 90 is, once again, carried on a shaft 98 in rotatable relation thereto, and the storage reel 90 is held on the shaft 98 by means of a press fitted cap 99.

In FIGS. 11 and 12 of the drawings, there is still another embodiment of the cord storage reel employing the concepts of the present invention as illustrated. Once again, there is illustrated a cord storage reel 100, including a front wheel 101, forming an outer ring 102 and an inner ring 103, the outer ring 102 and inner ring 103 being connected by spokes 104. The front wheel 101 is connected to a rear wheel (not shown) by means of a plurality of four connecting rods 105, in the same manner as described previously. In this embodiment, the connecting rods 105 do not extend outwardly beyond the spokes 104 of the front wheel 101. In this embodiment, it will be noted that the cord storage reel 100 is rotatably mounted on a shaft 106, which does extend outwardly beyond the front wheel 101 for a short distance, thereby forming an extension portion 107. A circular flat plate 108 is provided, the plate 108 being centrally apertured so as to be mounted upon the extension portion 107 of the shaft 106. The plate 108 is then fixedly secured to the extension portion 107 in a suitable manner, such that the shaft 106 extends outwardly beyond the front surface of the plate 108. Thereafter, the complete storage reel assembly is held on the shaft 106 by means of a press fitted cap 109.

Hence, in this embodiment of the cord storage reel, the auxiliary reel is formed by means of the extension portion 107 of the shaft 106 and is bounded by the circular plate 108. Hence, in this construction, it is not necessary to have the connecting rods 105 extend outwardly beyond the front wheel 101 as is shown in the other embodiments described hereinabove.

It is apparent from the above description that various means may be employed in order to form an auxiliary reel which is external to the main cord storage reel and yet fixedly secured thereto such that a pigtail or end portion of an electrical cord stored thereon may be wound about and stored in the auxiliary reel portion, thereby to facilitate the ability to connect the electrical cord to an outlet disposed closely adjacent to the place where the cord storage reel would be stored or otherwise utilized. The important feature is, therefore, the provision of an auxiliary storage reel external to the main storage reel which permits the end portion of an electrical cord stored thereon to be made accessible to easy use.

In the embodiments as shown and described in FIGS. 1 through 12 of the drawings, the cord storage reel assembly has been shown to include a support plate 70 upon which the shaft 74 is mounted, (note FIG. 3 of the drawings). The plate 56 is intended for mounting upon a wall or other similar structure, or for mounting upon a movable stand or the like. Hence, the storage reel 10 with an electrical cord stored thereon as shown in FIG. 6 of the drawings, may be completely removed from the wall plate 56 and transferred to any other location where desirable. However, in another embodiment of the present invention as illustrated in FIGS. 13 through 15 of the drawings, there is further included a stand which forms a fixed part of the assembly and renders the cord storage reel assembly, as a whole, more portable and easier to utilize.

With reference to FIG. 13 of the drawings, there is shown a cord storage reel assembly 110 which is formed by a front wheel and a rear wheel 14. The construction of both the front wheel 112 and the rear wheel 114 are identical to the wheels 14 and 16 described with reference to FIGS. 1 through 6 of the drawings, hence, each of the wheels 112 and 114 is formed by an outer ring 115 and an inner ring 116, the outer ring 115 and inner ring 116 being interconnected by a series of four spokes 117.

In a similar manner the rear wheel 114 is formed by an outer ring 118 and an inner ring 119 interconnected by spokes 120. The two wheels 112 and 114 are held in fixed horizontal alignment by means of a series of four connecting rods, 122, each of the connecting rods 122 extending outwardly beyond the front wheel 112 for a short distance to form an extension portion 124 terminating in a hook member 126. The cord storage reel 110 is rotatably mounted on a shaft 130, which in turn, is fixedly secured and mounted upon a support plate 132. The support plate includes a front surface 133, which carries the shaft 130 and a rear surface 134. The side edges 135 are tapered inwardly from top to bottom and are flared outwardly away from the front surface 133 of the support plate 132, thereby to form guide rails 136.

The rear surface 134 of the support plate 132 carries a stand structure generally referred to by the numeral 140. The stand structure includes a looped base, 142 having side edges 143 (see FIG. 13), which extend rearwardly and terminate in upstanding standards 144. The upper portions of the upstanding standards 144 are curved inwardly and terminate in upstanding mounting rods 146. Each of the two mounting rods 146 is mounted to the support plate 132 by any suitable means, such as weldments or the like, thereby to provide a stabilized stand structure 140 fixedly secured to the support plate 132, which in turn, carries the cord storage reel 110.

The side edges 143 of the stand 140 are spaced apart a distance substantially equal to the diameter of the front and rear wheels 114 respectively. The depth dimension of the stand 140 extends for a distance substantially equal to the overall distance measured from the rear portion of the rear wheel 114 forwardly to the front portion of the hook members 126. In this manner, a sturdy and stable stand 140 is provided for the cord storage wheel assembly 110 which, at the same time, permits the complete assembly 110 to be removably mountable upon a wall plate 148 as shown in FIG. 14.

It will also be observed that there is provided a handle 150 which is similarly fixedly secured to the rear surface 134 of the support plate 132. The handle 150 includes a horizontal grasp portion 152 which extends rearwardly and terminates in a downturned support rod 154 and terminates in a mounting rod 156 which is fixedly secured to the rear surface 134 of the support plate 132 by any suitable means such as a weldment or the like. The mounting rod 136 of the handle 150, and the mounting rod 156 of the stand 140 do not interfere with the mounting of the support plate 132 on the wall plate 148 due to the manner in which the side edges 135 of the support plate 132 are turned outwardly to form the guide rails 136. Hence, to store the storage reel 110 as shown in FIG. 13 of the drawings, the complete assembly including the cord storage reel 110 and the stand 140 fixedly secured thereto may be mounted on the wall plate 148 for convenience purposes and to provide a convenient out of the way storage posture for the complete assembly.

It will be noted that in the embodiment as shown in FIGS. 13 through 15 of the drawings, the assembly is completed by means of a rotatable handle 160 which is mounted to the outer ring 115 of the front wheel 112 in the manner as indicated previously and as shown in FIGS. 1 through 6 of the drawings.

The provision of the auxiliary reel serves many useful functions. For example, where the operator desires to mount the storage reel assembly within ten to fifteen feet of an electrical outlet, the operator need only wind an extension onto the reel by first winding between ten or fifteen feet onto the cord adjacent the male plug member onto the auxiliary reel and then continue winding the rest of the extension cord onto the main storage core of the storage reel. In this manner, the operator need not remove the entire length of extension cord from the reel in order to obtain access to the male plug for connection within an electrical outlet. The operator merely rotates the storage reel via the rotatable handle until the desired length of cord has been removed from the main storage reel for the intended use. Thereafter, the operator need only remove the desired number of feet from the auxiliary reel until a sufficient length of cord has been unwound to extend from the storage reel assembly to the electrical outlet.

It will be apparent to the operator that in many applications it may be desirable to have the female plug readily available by being wound around the auxiliary reel in the same manner as set forth above with respect to the male plug. For example, where an extension cord is to be used in connection with campers, or boating craft, the operator may wish to have the extension cord wound on the main storage reel with the female plug wound on the auxiliary reel while the male plug remains in the main storage core of the main storage reel. Hence, where it is desirable to electrically connect an appliance inside of the craft, and extend the extension cord to a point where there is an electrical outlet, the operator may merely remove the short pigtail having the female plug thereon from the auxiliary reel and extend the same to the appliance to be connected, and grasp the male plug member of the main storage reel and unwind the same until a sufficient length of cord has been unwound to extend it to the electrical outlet, and thereby achieve an electrical connection between the appliance inside the craft and the electrical outlet.

Another advantge achieved by virtue of the auxiliary reel is the fact that during the rewinding operation, the pigtail portion of the cord, that is the portion of the cord adjacent the male member, may be securely wound about the auxiliary reel prior to commencing to rewind. In this manner, as the operator rewinds the cord onto the storage reel, the pigtail portion of the cord will not be loosed to flop freely as the cord is rewound. Hence, the danger of the operator being struck by loosely dangling cords during the rewind operation is eliminated. Another important advantage which is realized by the structure of the present invention is the fact that a plurality of brackets or wall plates may be obtained and mounted in various locations. Hence, to move the extension cord from one location to another merely entails the operator removing the storage reel assembly by slidably removing the support plate out of engagement with the bracket or wall plate, transporting the reel to another mounting bracket or wall plate, and remounting same. It is apparent that in this manner, the cord remains very neatly and compactly stored on the reel during transport and hence, the operator need not be faced with the burdensome problem of untangling the cord after it has been moved from one place to another.

From the above description, it is clear that a simple and efficient storage reel assembly has been provided by virtue of the present invention, which operates in a manner to compactly store cords, such as electrical cords and the like, while at the same time permitting efficient use of the same. In addition, the storage reel assembly of the present invention permits the operator to obtain access to an electrical outlet which may be located approximate to the storage reel assembly without the need of having to completely unwind or unwrap the extension cord in order to obtain access to the male plug member.

In summary, a storage reel assembly accomplishing all of the foregoing objects and advantages has been developed and described herein.

While there has been described what at present is considered to be the preferred embodiments of the invention, it will be understood that various modifications may be made therein, and it is intended to cover in the appended claims all such modifications as fall within the true spirit and scope of the invention.

What is claimed is:

1. A storage reel for cords and the like comprising in combination,
   wheels including a front wheel and a rear wheel,
   spacer means positioned for holding each of said front and rear wheels and spaced apart in horizontal alignment,
   the space between said pair of wheels forming a storage core,
   means forming an auxiliary reel, said auxiliary reel being carried adjacent to said front wheel and spaced from said storage core,
   said auxiliary reel being diametrically smaller than the diameter of said front and rear wheels,
   a support plate for mounting said storage reel to a support surface,
   said support plate being provided with a shaft fixedly secured thereto and in normal relation therewith,
   said shaft being received through the central portion of said front and rear wheels, whereby said storage reel assembly is rotatably mounted on said shaft,
   securing means for securing said storage reel in rotary mounted position on said shaft,
   mounting means suitable for mounting on a support surface and constructed to receive said support plate in mounting relation thereby to effect mounting of said storage reel assembly on the support surface,
   whereby a cord such as an electrical cord and the like, may be stored on said storage reel by first winding a length of the cord about said auxiliary reel and then rotating said storage reel to take up and store the remainder of the cord in said storage core of said reel.

2. A storage reel for cords and the like, comprising in combination,
   wheels including a front wheel and a rear wheel, each of said wheels formed by an outer ring and an inner ring, and a plurality of spokes mounted on and interconnecting said outer ring and said inner ring
   spacer means for holding each of said front and rear wheels and spaced apart in horizontal alignment,
   the space between said pair of wheels forming a storage core,
   an auxiliary reel carried by said storage reel assembly, adjacent said front wheel and spaced externally from said storage core,
   said auxiliary reel being diametrically smaller than said front wheel,
   a support plate for mounting said storage reel to a support surface,
   said support plate being provided with a shaft fixedly secured thereto and in normal relation therewith,
   said shaft being received through the central portions of said front and rear wheels thereby to provide rotary mounting of said storage reel on said shaft,
   securing means for securing said storage reel in rotary mounted position on said shaft,
   and mounting means suitable for mounting on a support surface and constructed to receive said support plate in mounting relation thereby to effect the mounting of said storage reel on the support surface,
   whereby a cord such as an electrical cord and the like, may be sotred on such storage reel by first winding a length of the cord about said auxiliary reel and then rotating said storage reel to take up and store the remainder of the cord in such core of said reel.

3. A storage reel for cords and the like, comprising in combination,
   wheels including a front wheel and a rear wheel, each of said wheels formed by an outer ring and an inner ring, and a plurality of spokes mounting on and interconnecting said outer ring and said inner ring,
   each of said front and rear wheels being spaced apart and held in horizontal alignment by means of a plurality of rods,
   each of said rods being mounted upon and interconnecting associated spokes on said wheels,
   the space between said pair of wheels forming a storage core,
   each of said rods extending outwardly for a distance beyond the associated spoke of said front wheel and terminating in a hook member exposed planar to said rod with the upturned end of each of said hooks terminating a short distance below said outer ring of said front wheel,
   the hook members cooperating together to form an auxiliary reel external to the storage reel formed by said pair of wheels,
   a support plate for mounting said storage reel to a support surface,
   said support plate being provided with a shaft fixedly secured thereto and in normal relation therewith,
   said shaft being received through each of said inner rings of said pair of wheels, thereby to provide rotary mounting of said storage reel on said shaft,
   securing means for securing said storage reel in rotary mounted position on said shaft,
   and mounting means suitable for mounting on a support surface and constructed to receive said support plate in mounting relation thereby to effect the mounting of said storage reel on the support surface,
   whereby a cord, such as an electrical cord and the like may be stored on said storage reel by first winding a length of the cord about said auxiliary reel and rotating said storage reel to take up and store the remainder of the cord in said storage core of said reel.

4. The storage reel assembly as set forth in claim 1 above, wherein said spacer means comprises a plurality of rods, mounted on and interconnecting said front and rear wheels respectively, thereby to maintain said front and rear wheels in horizontally spaced relation.

5. The storage reel assembly as set forth in claim 4 above, wherein said auxiliary reel is formed by said rods, said rods being extended outwardly beyond the planar area formed by said front wheel, for a short distance, and each of said rods being turned upwardly to form hook membes, said hook members cooperating together to form said auxiliary reel external to the storage reel formed by said pair of wheels.

6. The storage reel assembly as set forth in claim 4 above, wherein said auxiliary reel means is formed by said rods, each of said rods extending externally outwardly beyond the plane formed by said front wheel for a short distance, and a planar member mounted on the terminal edges of each of said rods whereby said auxiliary reel is formed by the space between said planar member and said front wheel and is bounded internally by the circumferential periphery formed by the plurality of said rods.

7. The storage reel assembly as set forth in claim 1 above, wherein said auxiliary reel means is formed by said shaft, said shaft extending externally outwardly beyond the plane formed by said front wheel for a short distance, and a planar member mounted on said shaft adjacent the outer terminal end thereof whereby said auxiliary reel is formed by the space between said planar member and said front wheel.

8. The storage reel as set forth in claim 3 above, wherein each of the wheels includes four spokes per wheel mounted on and interconnecting the outer ring and the inner ring respectively of each of said wheels.

9. The storage reel as set forth in claim 8 above, which further includes a series of four rods, the inner end of each rod being mounted on an associated spoke of said rear wheel, and the outer end of each of said rods being mounted on the associated spoke of said front wheel, and extending outwardly therefrom for a short distance and terminating in an upturned end thereby to form a hook member, each of the four hook members associated with each of the four rods thereby cooperating to form an auxiliary reel external to said storage reel.

10. The storage reel as set forth in claim 3 above, which further includes a handle rotatably mounted on said front wheel, thereby to provide a grasping point for rotating the storage reel in circular motion.

11. The storage reel as set forth in claim 3 above, wherein said securing means comprises a press fitted cap having an internal diameter slightly less than the diameter of said shaft whereby the cap may be press fitted into frictional engagement with the outer end of said shaft.

12. A storage reel for cords and the like, comprising in combination,
wheels including a front wheel and a rear wheel,
spacer means for holding each of said front and rear wheels in spaced apart and horizontal alignment,
the space between said pair of wheels forming a storage core,
means forming an auxiliary reel, said auxiliary reel being carried adjacent to said front wheel and spaced from said storage core,
said auxiliary reel being diametrically smaller than the diameter of said front and rear wheels,
a support plate for mounting said storage reel to a support surface,
said support plate having an outer surface and an inner surface,
said inner surface of said support plate being provided with a shaft fixedly secured thereto and in normal relation therewith,
a reel stand formed by a base for providing support for said storage reel assembly, and upstanding members disposed adjacent the rear portion of said base and extending upwardly therefrom,
said upstanding members being fixedly secured to the outer surface of said support plate,
said shaft being received through the center portions of said front and rear wheels, thereby to provide rotary mounting of said storage reel on said shaft,
securing means for securing said storage reel in rotary mounted position on said shaft
and mounting means suitable for mounting on a support surface and constructed to receive said support plate in mounting relation, thereby to effect the mounting of said storage reel on the support surface,
whereby a cord such as an electrical cord and the like may be stored on said storage reel by first winding a length of the cord about said auxiliary reel and then rotating said storage reel to take up and store the remainder of the cord in said storage core of said reel.

13. The storage reel assembly as set forth in claim 12 above, which further includes a fixed handle, said handle having a grasping portion to permit the grasping and carrying of the storage reel assembly and a mounting portion extending downwardly therefrom, said mounting portion being fixedly secured to said outer surface of said support plate in spaced relation with respect to said upstanding members of said stand whereby said mounting portion of said handle and said upstanding members of said stand are all mounted on said outer surface of said support plate thereby to provide a complete storage reel assembly including a handle and a stand.

* * * * *